United States Patent Office 3,351,645
Patented Nov. 7, 1967

3,351,645
7,7-DIALKYLBICYCLO [3.2.0] HEPTAN-6-OLS AND ESTERS THEREOF
John R. Caldwell, Kenneth P. Perry and Winston J. Jackson, Jr., Kingsport, Tenn., assignors to Eastman Kodak Company, Rochester, N.Y., a corporation of New Jersey
No Drawing. Filed Feb. 9, 1962, Ser. No. 172,098
The portion of the term of the patent subsequent to Dec. 10, 1980, has been disclaimed.
7 Claims. (Cl. 260—410)

This invention relates to novel chemical compounds and more particularly to novel cyclic alcohols having a ring bridgehead and gem dialkyl groups adjacent to a secondary hydroxy group and to novel esters of the alcohols.

The cyclic alcohols of the invention are 7,7-dialkylbicyclo[3.2.0]heptan-6-ols of the type:

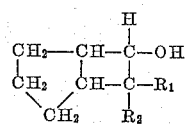

wherein $R_1$ and $R_2$ are the same or different lower alkyl radicals, i.e., straight or branched chain alkyl radicals having from 1 to about 4 carbon atoms. These novel alcohols can be reacted with carboxylic acids to produce novel esters of excellent hydrolytic stability which are useful as plasticizers for poly(vinyl chloride), cellulose ethers and cellulose esters.

The alcohols of the invention are prepared by adding a dialkylketene (I) to cyclopentadiene and then reducing the unsaturated ketone (II) to the saturated cyclic alcohol (III):

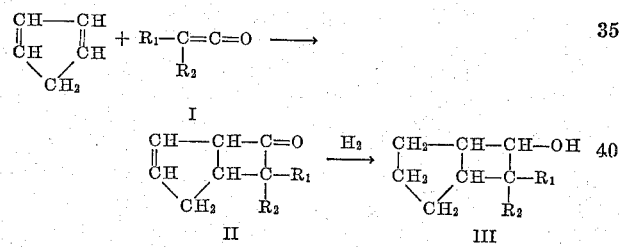

In the above reaction equations $R_1$ and $R_2$ are lower alkyl radicals, as previously indicated. Examples of suitable dialkylketenes having such substituents $R_1$ and $R_2$ include dimethylketene, methylethylketene, diethylketene, diisopropylketene, dibutylketene, ethylbutylketene, etc. Such ketenes can be prepared by the pyrolysis of a dialkyl acetic acid anhydride as described in Canadian Patent No. 618,772.

The unsaturated bicycle ketone intermediates for our novel alcohols can be prepared by the addition of cyclopentadiene to a dialkyl ketene, according to the procedure of Staudinger and Meyer, Helv. Chim. Acta, 7, 21 (1924). The procedure involves forming a solution of cyclopentadiene in a solvent such as hexane, and passing the dialkyl ketene vapor into the solution, which is maintained at low temperature, e.g., 6 to 12° C., over a period of several hours. The low boilers are removed from the reaction product by vacuum distillation and the residue comprises the unsaturated ketone product.

The unsaturated ketone is converted to the novel alcohol of the present invention by catalytic hydrogenation. Suitable procedure comprises contacting the ketone with hydrogen and a solid hydrogenation catalyst in an agitated autoclave at a temperature of 100 to 200° C. and under a hydorgenation pressure of 50 to 200 atmospheres. Solid hydrogenation catalysts suitable for reduction of the unsaturated ketone to the saturated alcohol include such metals as nickel and ruthenium, which metals can be employed in colloidal, powdered or granular form. Preferably, the catalyst metal is deposited on a catalyst support or carrier such as alumina, carbon or kieselguhr. The supported catalysts can be in the form of powder, pellets, granules or the like. The well-known copper chromite catalysts and barium-promoted copper chromite catalysts are also suitable. These also can be used in powdered or pelleted form. Specific examples of suitable hydrogenation catalysts include (a) Raney nickel, (b) reduced nickel catalyst containing 50 to 65 percent nickel on kieselguhr, (c) supported ruthenium catalyst comprising 0.2 to 10 percent ruthenium on carbon and (d) pelleted barium-promoted copper chromite catalyst containing 30 to 80 percent copper as CuO, 15 to 55 percent chromium as $Cr_2O_3$, 0 to 15 percent barium as BaO and the rest a water soluble binder such as sodium silicate.

The novel esters are prepared in accordance with the invention by heating a carboxylic acid with the cyclic alcohol (preferably, in slight excess over the molar equivalent to the acid) and with a small amount of catalyst and a small amount of an inert volatile solvent that serves as an azeotroping agent. In the preferred procedure the water evolved in the reaction is collected in a Dean-Stark trap filled with the azeotroping solvent. The volume of the water layer in the trap indicates the degree of completion of the reaction.

The carboxylic acids from which the novel esters of the invention are prepared can be monobasic or dibasic acids and can be aliphatic, alicyclic or aromatic. They can be defined as acids of the formulae, R—COOH and

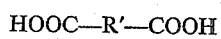

HOOC—R'—COOH wherein R is a monovalent and R' is a divalent hydrocarbon radical of about 4 to about 20 carbon atoms, including branched and straight chain alkyl and alkylene radicals, aryl and arylene radicals, and cycloalkyl and cycloalkylene radicals. Examples of suitable acids include 2-ethylhexanoic acid; pelargonic acid; adipic acid; 2-methyladipic acid; pimelic acid; azelaic acid; sebacic acid; 1,2-cyclohexanedicarboxylic acid; and 1,3-phenylenediacetic acid.

The esterification reaction of the acid and the cyclic alcohol will proceed slowly in the absence of a catalyst but the use of a catalyst is greatly preferred in order to achieve a satisfactory reaction rate. The preferred catalysts are metallic esterification catalysts. Examples of these include titanium alkoxides such as titanium tetraisopropoxide and other alkoxides of titanium prepared from lower alkanols, i.e., aliphatic monohydroxy alcohols of one to about four carbon atoms. Various other organo-titanium compounds are also suitable catalysts as well as titanium oxides and hydroxides. Such catalysts are described in the patents to Caldwell, U.S. 2,727,881 and U.S. 2,720,502; Haslam, U.S. 2,822,348; and British Patents Nos. 852,109, 851,600 and 852,110. The latter two patents also disclose suitable organo-zirconium esterification catalysts. Still other suitable metallic esterification catalysts include various organo-tin compounds, e.g., tin alkoxides, tetraalkyl tin compounds, etc., as disclosed in British Patent No. 810,381 and German Patent No. 1,005,947; lead oxide, sodium aluminate, manganese acetate and the like. As we have indicated, only a small amount of catalyst is required, e.g., from about 0.1 to 2 weight percent of the reaction mixture. Larger amounts of catalyst can be used but no advantage is thereby gained.

While the described metallic esterification catalysts are greatly preferred, acidic esterification catalysts, e.g., sulfuric acid, hydrochloric acid, $BF_3$, etc. can be used. However, if an acidic esterification catalyst is used, dehydration and rearrangement of the cyclic alcohol can take place instead of esterification.

The esterification reaction is preferably carried out in the presence of a volatile, inert, organic liquid that forms an azeotrope with water that distills at the desired reaction temperatore in the range of about 150 to 250° C. The preferred reaction temperature is in the range of 180 to 200° C. and the preferred azeotroping agent for this reaction temperature is p-cymene. Other azeotroping agents such as benzene, toluene, cumene, etc. can be used. However, with the lower boiling liquids the reaction temperature is lower and the reaction time is longer.

The esters of our invention are valuable as plasticizers for poly(vinyl chloride), cellulose ethers and cellulose esters such as cellulose acetate propionate and cellulose acetate butyrate, all of which can be processed on hot rolls. The ester is normally employed in an amount of about 25 to 100 parts by weight per 100 parts of resin. Our novel esters are particularly valuable as plasticizers because they are highly resistant to hydrolysis and can be used in molded articles and films under humid conditions that would cause hydrolysis of conventional plasticizers. Also the higher diesters, i.e., those prepared from dicarboxylic acids having at least 7 carbon atoms, plasticize poly(vinyl chloride) even at −40° C. whereas most plasticized poly(vinyl chloride) compositions are quite brittle at such low temperature.

The following examples illustrate the novel alcohols and esters of the invention:

Example 1

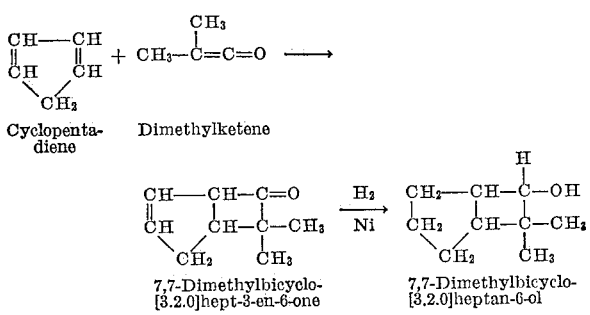

7,7-dimethylbicyclo[3.2.0]hept-3-en-6-one was prepared by the addition of cyclopentadiene to dimethylketene by a procedure similar to that of Staudinger and Meyer, Helv. Chim. Acta, 7, 21 (1924). Our procedure was to form a solution of 340 g. of cyclopentadiene in 1500 ml. of hexane in a reaction vessel. Dimethylketene vapor was passed into the solution continuously over a period of 7 hours, the reaction mixture being maintained at 6 to 12° C. by an ice bath. Additional portions of cyclopentadiene were added to the reaction vessel during the period of 7 hours, the total amount being 1500 g. including the initial 340 g. The reaction mixture was allowed to stand overnight and then low boilers were distilled off up to 340°C. at 7 mm. Hg and the residue was recovered as the unsaturated ketone product. The latter was thereafter hydrogenated in an autoclave over a supported nickel catalyst (Girdler G-49: a reduced, stabilized nickel catalyst containing 50 to 65 weight percent nickel on kieselguhr) at 150° C. and 1500 p.s.i. of hydrogen. The hydrogenation product was the novel alcohol, 7,7-dimethylbicyclo[3.2.0]heptan-6-ol.

Example 2

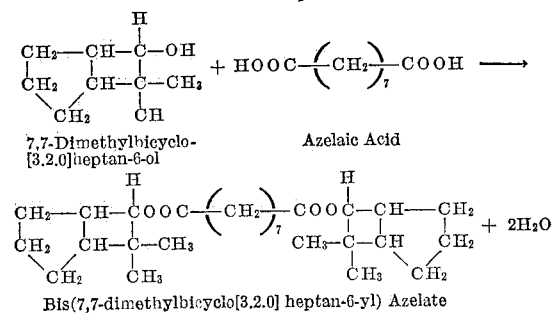

The new 7,7-dimethylbicyclo[3.2.0]heptan-6-ol of Example 1 was esterified by refluxing a solution containing 154 g. (1.1 moles) of the cyclic alcohol, 94 g. (0.5 mole) of azelaic acid, 100 ml. of p-cymene, and 2 g. of titanium tetraisopropoxide. The water which was formed was collected in a Dean-Stark trap filled with p-cymene. After the theoretical amount of water was obtained, the solution was cooled, stirred with a sodium bicarbonate slurry, washed with water, dried with sodium sulfate, and concentrated. When the product was then molecularly distilled, it was collected at 121° C./60 microns.

After refluxing in water for 96 hours, a 1.0 g. sample of the Example 2 ester required 0.011 meq. of alkali to neutralize the acid formed. Therefore, the same was only 2.4% hydrolyzed.

A mixture containing 40 parts of the Example 2 ester and 100 parts of cellulose acetate butyrate was milled on heated rolls to give a clear, flexible, tough sheet. In a similar manner poly(vinyl chloride) was plasticized, yielding a clear, flexible, tough sheet.

An equal amount of the Example 2 ester and poly(vinyl chloride) were dissolved in cyclohexanone, and a film was cast. After drying in a vacuum oven at 60° C., the film was placed in a −40° F. cold box for 2 hours. It remained flexible and did not break when creased at this temperature.

Example 3.—Bis(7,7-dimethylbicyclo[3.2.0]hetan-6-yl) adipate

The procedure of Example 2 was repeated, substituting adipic acid for azelaic, and producing the novel ester, bis(7,7-dimethylbicyclo[3.2.0]heptan-6-yl) adipate. After 96 hours in boiling water a sample of this ester was only 0.9 percent hydrolyzed. The ester plasticized cellulose acetate propionate and poly(vinyl chloride) when milled on heated rolls as described for the Example 2 ester.

Example 4.—7,7-methylethylbicyclo[3.2.0]heptan-6-ol and the pelargonic acid ester 7,7-methylethylbicyclo[3.2.0]heptan-6-ol was prepared by the reaction of cyclopentadiene and methylethylketene and subsequent hydrogenation of the intermediate unsaturated ketone, according to the procedure of Example 1. The novel cyclic alcohol was then esterified with pelargonic acid substantially according to Example 2. A sample of the resulting 7,7-methylethylbicyclo[3.2.0]heptan-6-yl pelargonate was subjected to the boiling water hydrolysis test. After 96 hours the sample of the ester was only 1.2 percent hydrolyzed. This ester plasticized cellulose esters, cellulose ethers and poly(vinyl chloride) when milled on heated rolls.

Example 5.—7,7-methylbutylbicyclo[3.2.0]heptan-6-yl stearate

Using the methods described above, the stearic acid ester of 7,7-methylbutylbicyclo[3.2.0]heptan-6-ol was prepared. The product was a wax that softened at 40–50°. It was useful as a constituent of textile finishing agents and as an additive for polyethylene and polypropylene.

The novel alcohols of the present invention are also useful for preparing esters of certain oxydicarboxylic acids, which esters are the subject matter of the copending application of two of us, John R. Caldwell and Winston J. Jackson, Jr., Ser. No. 166,703, filed Jan. 16, 1962, now U.S. Patent 3,113,963, entitled, "Esters of Oxydicarboxylic Acids and Cyclic Alcohols." Esters of such oxydicarboxylic acids are often readily hydrolyzed but those formed from the alcohols of the present invention have excellent hydrolytic stability. For example, diesters of oxydiacetic acid with 2-norcamphanol, an alicyclic alcohol, and with 2-ethylhexanol, an aliphatic alcohol, have been prepared. In hydrolysis tests a sample of the former was 63 percent hydrolyzed after 96 hours in boiling water and a sample of the latter was completely hydrolyzed. In contrast, a diester of oxydiacetic acid and our new alcohol, 7,7-dimethylbicyclo[3.2.0]heptan-6-ol, was only 1.5 percent hydrolyzed after 96 hours in boiling water. A diester of ethylenedioxydiacetic acid and our novel alcohol, 7,7-ethylbutylbicyclo[3.2.0]heptan-6-ol, was only 0.9 percent hydrolyzed in the same type of test.

The invention has been described in considerable detail with particular reference to certain preferred embodiments thereof, but it will be understood that variations and modifications can be effected within the spirit and scope of the invention as described hereinabove, and as defined in the appended claims.

We claim:
1. Cyclic alcohols of the formula:

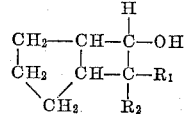

wherein $R_1$ and $R_2$ are lower alkyl radicals.
2. 7,7-dimethylbicyclo[3.2.0]heptan-6-ol.
3. 7,7-methylethylbicyclo[3.2.0]heptan-6-ol.
4. Esters of cyclic alcohols of the formula:

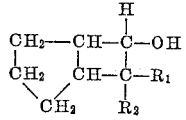

wherein $R_1$ and $R_2$ are lower alkyl radicals, and a carboxylic acid of the formula selected from the group consisting of R—COOH and HOOC—R'—COOH, wherein R is a monovalent hydrocarbon radical of about 4 to about 20 carbon atoms and R' is a divalent hydrocarbon radical of about 4 to about 20 carbon atoms.
5. Bis(7,7-dimethylbicyclo[3.2.0]heptan-6-yl) azelate.
6. Bis(7,7-dimethylbicyclo[3.2.0]heptan-6-yl) adipate.
7. 7,7-methylethylbicyclo[3.2.0]heptan-6-yl pelargonate.

References Cited

UNITED STATES PATENTS

| | | | |
|---|---|---|---|
| 2,802,880 | 8/1957 | Stoll et al. | 260—617 |
| 2,817,673 | 12/1957 | Roelen et al. | 260—410 |
| 2,882,286 | 4/1959 | Brokaw | 260—410 |
| 2,912,458 | 11/1959 | Brannock | 260—485 |
| 2,936,324 | 5/1960 | Hasek et al. | 260—410 |
| 2,993,076 | 7/1961 | Molotsky | 260—617 |
| 3,113,963 | 12/1963 | Caldwell et al. | 260—473 |

OTHER REFERENCES

Standinger et al.: "Helv. Chim. Acta," 7, 21 and 22 (1924).

LEON ZITVER, *Primary Examiner.*

TOBIAS E. LEVOW, DANIEL D. HORWITZ,
A. E. TANENHOLTZ, J. M. BANE, J. E. EVANS,
*Examiners.*